(12) United States Patent
Gordon et al.

(10) Patent No.: US 8,086,030 B2
(45) Date of Patent: Dec. 27, 2011

(54) METHOD AND SYSTEM FOR VISUALLY PRESENTING A HIGH DYNAMIC RANGE IMAGE

(75) Inventors: Gadi Gordon, Rehovot (IL); Ofer Yemini, Gedera (IL); Gal Lazar, Kiryat Ekron (IL); Haim Klinman, Rosh Haayeen (IL); Zadok Hadas, Ofra (IL); Yuval Gronau, Tel Aviv (IL); Nissim Alfasi, Rosh Haayeen (IL)

(73) Assignee: Elbit Systems Electro-Optics Elop Ltd., Rehovot (IL)

( * ) Notice: Subject to any disclaimer, the term of this patent is extended or adjusted under 35 U.S.C. 154(b) by 1014 days.

(21) Appl. No.: 11/996,227

(22) PCT Filed: Jul. 18, 2006

(86) PCT No.: PCT/IL2006/000829
§ 371 (c)(1),
(2), (4) Date: Jan. 18, 2008

(87) PCT Pub. No.: WO2007/010531
PCT Pub. Date: Jan. 25, 2007

(65) Prior Publication Data
US 2008/0187215 A1    Aug. 7, 2008

(30) Foreign Application Priority Data
Jul. 19, 2005    (IL) .......................... 169758

(51) Int. Cl.
*G06K 9/00*    (2006.01)
(52) U.S. Cl. .................... 382/162; 382/165; 382/167
(58) Field of Classification Search ............... 382/162, 382/163, 164, 165, 166, 167; 348/277, 238; 347/251, 253; 358/1.9, 564, 515; 235/375, 235/432; 283/38
See application file for complete search history.

(56) References Cited

U.S. PATENT DOCUMENTS

| | | | |
|---|---|---|---|
| 6,239,829 B1 * | 5/2001 | Curry | 347/251 |
| 7,088,372 B2 * | 8/2006 | Yoshida | 345/589 |
| 7,164,498 B2 * | 1/2007 | Van Bael | 358/1.9 |
| 7,428,332 B2 * | 9/2008 | Spaulding et al. | 382/167 |
| 7,683,912 B2 * | 3/2010 | Yoshida | 345/589 |
| 7,812,870 B2 * | 10/2010 | Utz et al. | 348/277 |
| 7,830,420 B2 * | 11/2010 | Hyoudou | 348/229.1 |

\* cited by examiner

*Primary Examiner* — Anh Hong Do
(74) *Attorney, Agent, or Firm* — Lathrop & Gage LLP

(57) ABSTRACT

Method for presenting an image, exhibiting a dynamic range, the method including the procedures of determining the dynamic range of the image, determining a color space configuration including more than one cycle of a color space, applying the color space configuration to the dynamic range, and displaying the image to a user, according to the color space configuration.

6 Claims, 13 Drawing Sheets
(9 of 13 Drawing Sheet(s) Filed in Color)

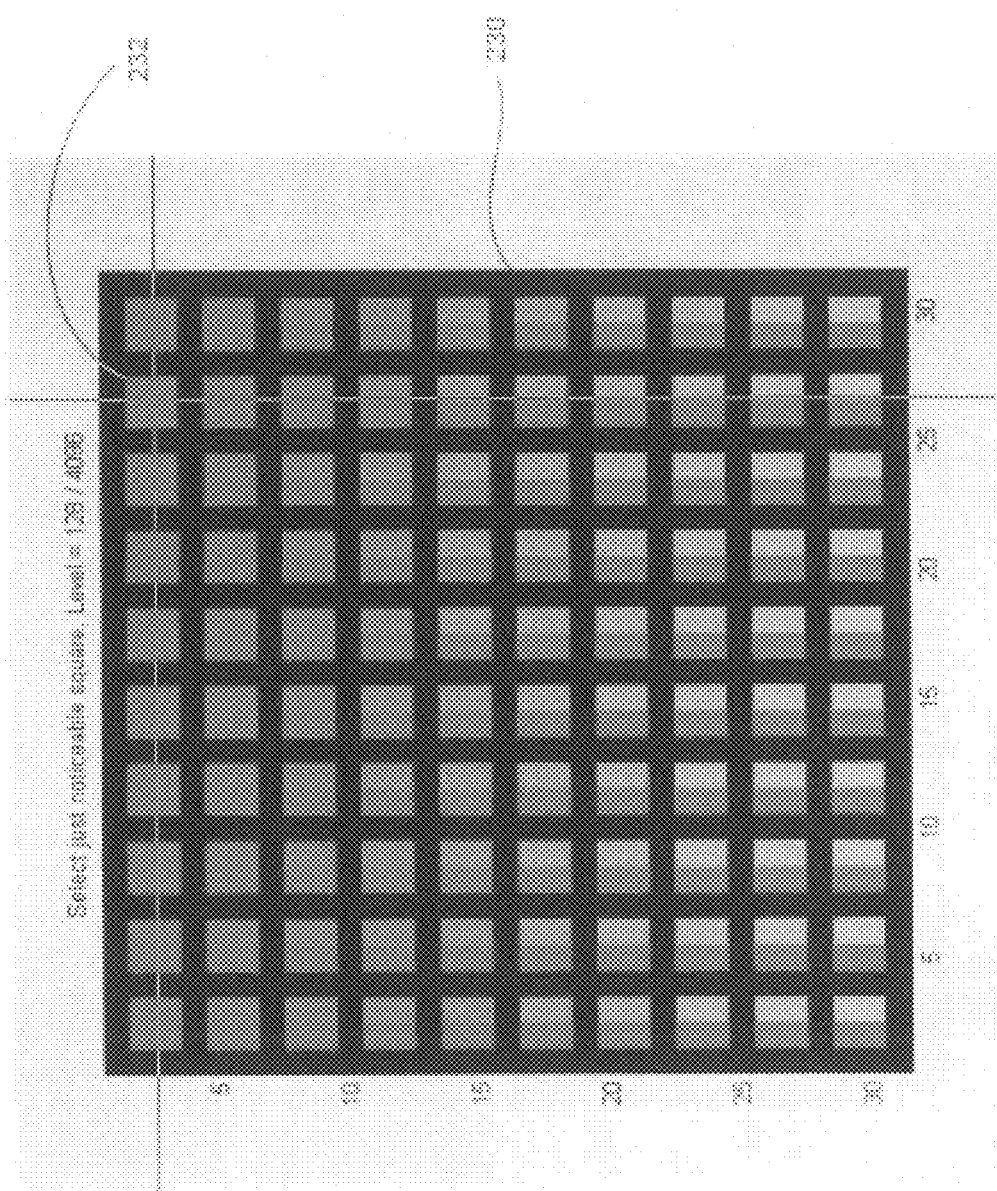

METHOD AND SYSTEM FOR VISUALLY PRESENTING A HIGH DYNAMIC RANGE IMAGE

FIELD OF THE DISCLOSED TECHNIQUE

The disclosed technique relates to methods and systems for displaying detailed images in general, and to methods and systems for enhancing the visibility of details in an image, in particular.

BACKGROUND OF THE DISCLOSED TECHNIQUE

Methods and systems for improving the visibility of details in an image, are known in the art. For example, a conventional thermal image is provided, as arrays of values, each representing a different temperature. Conventionally, a visible space (e.g., grayscale or RGB) is assigned to these values, enabling the user to view the thermal information visually, and not as a set of values.

U.S. Pat. No. 6,033,107 to Farina et al entitled "Temperature mapping system", is directed to a system and method for deriving a high resolution, two dimensional graphic representation of the surface temperature of an object. The system uses the light polarizing properties of a nematic liquid crystal (NLC) material to indicate the temperature of an electronic component, such as an integrated circuit (IC). The surface of the electronic component is coated with the NLC material. A temperature control platform, on which the electronic component is mounted, varies the temperature of the electronic component through a range of temperatures. The temperature at which the NLC material changes phase is between the lower limit and the upper limit of the range of temperatures. An optics element captures a sequence of images of the electronic component, using light reflected by the NLS coated surface and passing through a cross polarizer. Each of the images depicts a two dimensional representation of the surface at a certain temperature within the range of temperatures. A computer system stores a digital representation of the sequence of images, processes the image sequence, and constructs a color-coded thermal map of the surface temperature distribution of the electronic component. An algorithm defines the intensity signature of valid "hot spots" in selected images, and determines the location of the hot spots on the surface as a function of the intensity signature. The selected images are determining by detecting the first image in a sequence to have a dark spot, and identifying the temperature corresponding to the first image, thereby determining the temperature at which the NLC material changes phase.

The potential hot spots in the image are detected by binarizing the pixels in the image, so that each pixel is designated as either a hot spot pixel or a non hot spot pixel. In particular, each pixel is compared to a threshold range, and then the pixel is designated as a hot spot pixel if it falls within the designated range. Each potential hot spot pixel is verified, by comparing consecutive images and eliminating hot spot pixels not having a hot spot pixel in the corresponding location in a succeeding image. The potential hot spot pixels are further verified by adding pixels at corresponding locations of the selected pixels, producing a resulting pixel with an integer value representing the number of images having hot spot pixels at that corresponding location. The resulting pixel includes an integer value corresponding to an assigned temperature, and being represented by a predetermined color. The resulting pixels are used in constructing the color-coded thermal map of the surface temperature distribution of the electronic component.

U.S. Pat. No. 4,520,504 to Walker et al entitled "Infrared system with computerized image display", is directed to a system which generates computerized display images of infrared scenes. The system includes an infrared scanner, a tape recorder, a digitizer, a computer, a display generator, and a television monitor. The infrared scanner collects infrared radiation emitted from an object, such as a structure exhibiting heat flow across its surface (e.g., reactor piping, power cabling). The infrared scanner converts the radiation into a real-time visual image, the intensity of which is a function of the intensity of the measured infrared radiation. The visual image provided by the infrared scanner cannot be calibrated nor saved for later use. The tape recorder records the detector output of the infrared scanner, in the form of analog signals for pixels in frames with a scanning raster. The digitizer receives the analog signals and generates corresponding digital signals for each pixel, each digital signal being a function of the intensity of the infrared radiation measured from the object. The computer receives the digital signals, and performs processing which involves at least surveying all pixel brightness values, and identifying maximum and minimum values. The display generator creates a display frame from the digital signals. The display frame is sent to the television monitor, which displays an image of the object. The television monitor further displays a grey scale alongside the image, to provide calibrated quantitative information related to the temperature at different locations of the object.

U.S. Pat. No. 6,868,171 to Souluer entitled "Dynamic color imaging method and system", is directed to a method and system for creating color images displaying variations of tissue density over selected regions to facilitate detection of tissue anomalies. The system includes a controller, a detector, a locator and a camera. The detector collects data related to tissue characteristics. The characteristic data may relate to a single property of the tissue (e.g., tissue density), or to a combination of properties (e.g., tissue density, tissue temperature, tissue color). The locator collects data related to the length and width dimensions of the patient relative to a location pattern on the platform on which the patient is positioned. The locator further collects data related to the length and width dimensions of the detector relative to the tissue of the patient and to the location pattern. An optical head on the locator collects data related to height dimension of the detector relative to the tissue of the patient. The camera provides an image of the tissue of the patient, and collects data related to the length and width dimensions of the tissue relative to the image.

The controller receives the image from the camera and divides the image into predetermined portions. The controller receives characteristic data of the tissue from the detector for each portion of the image. The controller associates a color, or a shade thereof, to incremental values of the characteristic data for each portion of the image. The color displayed for each portion of the image portrays the degree of variation of the value of the characteristic data relative to the characteristic data value for other portions of the tissue. The system displays the color for each portion of the image on a monitor or display screen.

The controller uses the data received from the locator to monitor the position of the detector relative to the tissue, and to associate the position of the detector to each portion of the image. The controller may further use the height data from the optical head, to allow recording of the characteristic data in three dimensions, and to create and display a three-dimensional image of the tissue characteristics. The system may further compare recorded characteristic data for coordinates of the tissue with previously determined characteristic data for the same coordinates of the tissue. The system displays an image of the tissue, and assigns a color to each portion of the image based upon any degree of change in the characteristic data for that portion of the image. The change displayed may be an absolute difference in the compared characteristic data, a first derivate analysis, or a combination thereof.

U.S. Pat. No. 5,012,333 to Lee et al entitled "Interactive dynamic range adjustment system for printing digital images", is directed to a method and system for processing an image of a wide dynamic range scene, such that the printed image resembles the original scene. The method is based on an understanding of visual photoreceptor adaptation and human visual contrast sensitivity. A processor receives a digitized image captured by an image scanner. The processor transforms the red, green, blue (R,G,B) components of the image to the luminance and chrominance components. A low pass filter extracts the low frequency component of the luminance image component. The low frequency component is mapped to a normalized density through a dynamic range adjustment curve, which adjusts the contrast of the low frequency component. In particular, a given pixel is printed darker by subtracting a fraction of the averaged surround density from the density of the pixel. The surround of the pixel is the weighted average density of all neighboring pixels. The fraction of the averaged surround density subtracted from the pixel is selected to be a function of the averaged density (i.e., rather than a constant). The system displays the original digital image next to a dynamic range adjusted image, and may further display the density histogram of the image. The location and amount of compression or expansion of the dynamic range of the printed image may be controlled, by altering the shape of the function. A user may manipulate the function interactively, for example by using the displayed density histogram and the adjusted image as feedback.

SUMMARY OF THE DISCLOSED TECHNIQUE

It is an object of the disclosed technique to provide a novel method and system for visually enhancing details in a high dynamic range image. In accordance with the disclosed technique, there is thus provided a method for presenting an image, exhibiting a dynamic range, the method including the procedures of: determining the dynamic range of the image, determining a color space configuration including more than one cycle of a color space, applying the color space configuration to the dynamic range, and displaying the image to a user, according to the color space configuration.

In accordance with a further aspect of the disclosed technique, there is thus provided a method for optimizing a color space, the method includes the procedures of: presenting the user with a chromatic presentation of a selected reference color in a given color space, presenting the user with a plurality of chromatic presentations of colors adjacent to the selected reference color in the color space, receiving user identification of noticeable color difference between the selected reference color and the adjacent colors, and determining the adjacent color closest to the selected reference color, with noticeable change, as the next color in an optimized color space.

In accordance with a further aspect of the disclosed technique, there is thus provided a system for presenting an image, exhibiting a dynamic range. The system includes a dynamic range analyzer, for analyzing the dynamic range of the image, a color space analyzer, for determining a color space configuration more than one cycle of a color space, and a dynamic range—color space converter, coupled with the dynamic range analyzer and with the color space analyzer, for applying the color space configuration to the dynamic range. The system enables visual perception of features which were essentially un-noticeable in the image prior to applying the color space configuration to the dynamic range.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosed technique will be understood and appreciated more fully from the following detailed description taken in conjunction with the drawings in which:

FIG. 8 is a chromatic illustration of colors presented to a user, in the process of executing the method of FIG. 7;

DETAILED DESCRIPTION OF THE EMBODIMENTS

The disclosed technique overcomes the disadvantages of the prior art by providing a novel method and system for presenting high dynamic range images, using a cyclic color space, which repeats itself several times through the dynamic thermal range of the image. The examples set forth in the following description, shall be directed at images received by thermal imaging, which are analyzed and presented using the disclosed technique. However, the disclosed technique applies to any type of imaging wherein the original dynamic range is too high to enable detecting certain details and faint signal levels. The disclosed technique can be used to present information acquired by many types of detectors, such as near infrared, short wave infrared, ultra violet, computerized tomography, nuclear imaging, ultrasound, X-ray, ultra wide band (UWB), synthetic aperture radar (SAR), scanning electron microscope (SEM), and the like. By employing the disclosed technique and increasing the ability of the user to observe a higher level of details, and hence identify a certain material, object or phenomena which were otherwise undetectable. In other words, applying a color space configuration according to the disclosed technique to a given dynamic range, enables visual perception of features which were essentially un-noticeable in the image. It is further noted that the disclosed technique can be applied to any type of object (e.g., living, plant, man made or natural), which is either still, moving or changing in time. Furthermore, the disclosed technique can be applied to a still image as well as to video images of any type of object or scene.

Figure 1A:
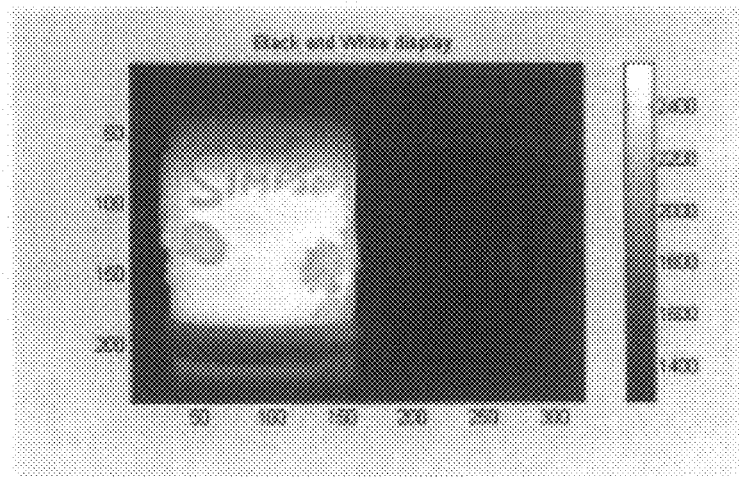
FIG. 1A is a conventional thermal image of a cup with cold water and a cup with boiling water, presented in gray scale, according to methods which are known in the art.
Figure 1B:
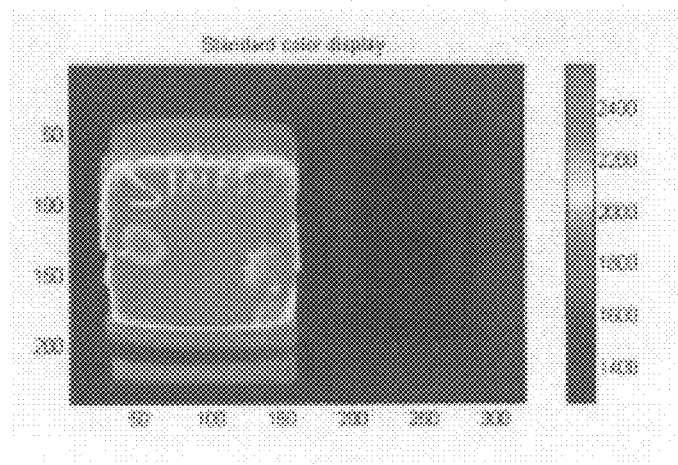
FIG. 1B is a conventional thermal image of FIG. 1A, presented in color, according to methods which are known in the art.

Reference is now made to FIGS. 1A and 1B. FIG. 1A is a conventional thermal image, generally referenced 100, of a cup with cold water and a cup with boiling water, presented in gray scale, according to methods which are known in the art. FIG. 1B is the conventional thermal image 100 of FIG. 1A, presented in color, according to methods which are known in the art.

In FIG. 1B, thermal image 100 is presented by assigning a color space (e.g., RGB) to the entire dynamic range of the image. Accordingly, each temperature is assigned a unique color which increases the ability of the user to identify small changes in the temperature. However, as can be seen from the image, when the total dynamic range is 10 degrees Celsius, extremely small changes in the temperature (i.e., of 0.01 degrees Celsius) are not visible, since the color resolution visible to the human eye in this case, is around 0.1 degrees Celsius.

According to the disclosed technique, by using a cyclic color space spread over a small dynamic range and repeated across the entire temperature dynamic range, smaller changes in the temperature may be visible to the human eye.

Figure 2:
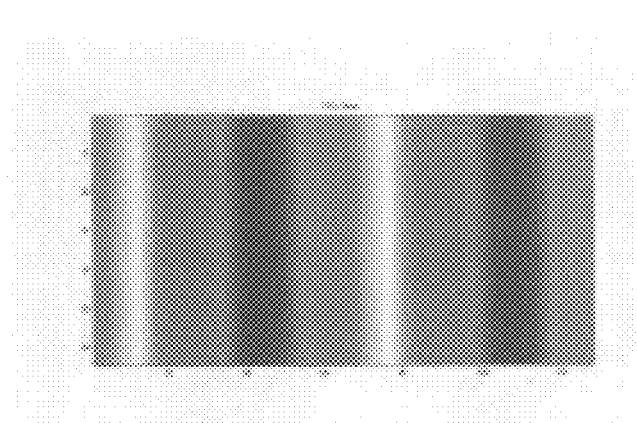
FIG. 2 is a representation of a cyclic color space, repeating over a given dynamic temperature range, in accordance with an embodiment of the disclosed technique.

Reference is now made to FIG. 2, which is a representation of a cyclic color space, repeating over a given dynamic temperature range, in accordance with an embodiment of the disclosed technique. A single repetition of that color space is referenced 120 and extends from purple at [55] to red between [60] and [70], to yellow at [75], to green between [80] and [90] to light blue at [95], to blue between [100] and [110] and back again to purple at [115]. This color space is also known in the art as Hue, Saturation and Value (HSV) color space.

Figure 3:
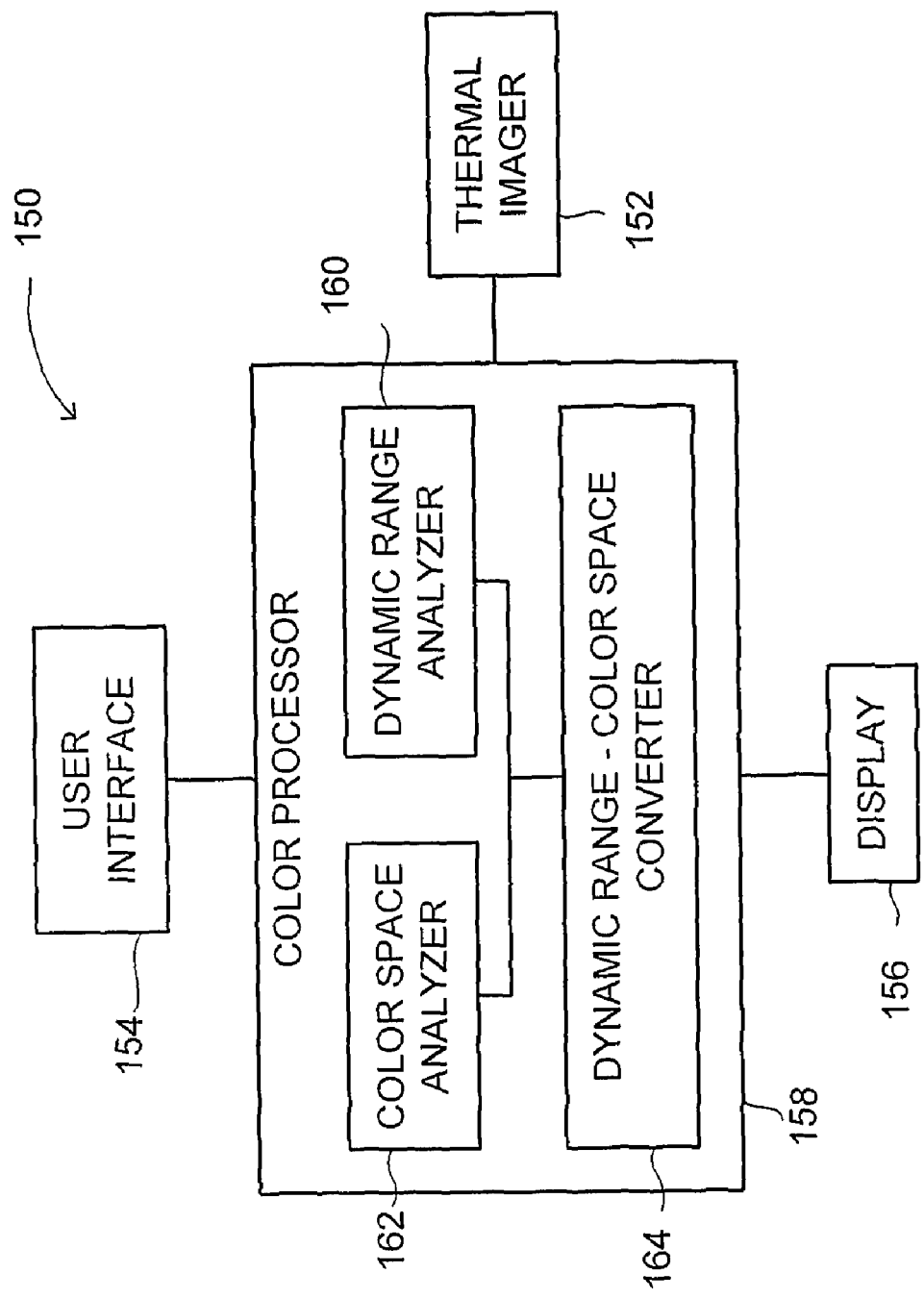
FIG. 3 is a schematic illustration of an imaging system, capable of presenting an image by repeating a color space throughout the dynamic range of the image, constructed and operative in accordance with an embodiment of the disclosed technique.

Reference is now made to FIG. 3, which is a schematic illustration of an imaging system, generally referenced 150, capable of presenting an image by repeating a color space throughout the dynamic range of the image, constructed and operative in accordance with an embodiment of the disclosed technique. System 150 includes a thermal imager 152, a user interface 154, a display 156 and a color processor 158. Color processor 158 is coupled with thermal imager 152, user interface 154 and a display 156. Color processor includes a dynamic range analyzer 160, a color space analyzer 162 and a dynamic range—color space converter 164. Dynamic range—color space converter 164 is coupled with dynamic range analyzer 160 and color space analyzer 162. User interface 154 can be configured to enable the user to select between different predetermined color schemes and configurations, to define new color schemes and configurations and to dynamically (e.g., discretely or continuously) modify existing color schemes and configurations.

It is noted that thermal imager 152 can be replaced with any type of wide dynamic range image acquisition device (e.g., visible light camera, non-visible light camera, magnetic resonance imager, ultrasound imager, electromagnetic imager, millimeter wave imager, Tera-Hz imager, X-ray imager and high-energy radiation imager)

Thermal imager 152 acquires an image and provides a digital representation thereof to color processor 158. Dynamic range analyzer 160 analyzes the dynamic range of the received image and determines the effective range to be further processed. It is noted that filtering may be applied to the acquired image, either in physical form, by placing a filter in front of the imager, or by disregarding certain ranges within the original dynamic range of the acquired image or by applying image processing filters. Dynamic range analyzer 160 produces an optimized dynamic range image and provides it to dynamic range—color space converter 164 and may further provide information relating thereto to color space analyzer 162 (e.g., the effective dynamic range of the image or of objects of interest in that image).

Color space analyzer 162 analyzes the color space selected for presenting the acquired image and optimizes the color space for high visible color resolution, as shall be viewed by the human eye, according to the characteristics of the human eye, the dynamic range of the acquired image, the effective dynamic range of the objects of interest in the image and user provided parameters. Color space analyzer 162 produces an optimized color space and provides it to dynamic range—color space converter 164.

Dynamic range—color space converter 164 imposes the optimized color space repeatedly across the optimized dynamic range of the acquired image, produces a repeated color space image and provides it to display 156. Display 156 presents the repeated color space image to the user, who in turn, can provide the system with further instructions to change the color presentation, using user interface 154.

The disclosed technique employs varying color space cycle and varying color space phase shift, to visually emphasize small differences in the image, which would not be visible using a conventional display technique.

It is noted that according to the disclosed technique, a first feature in the image, detected at a signal level $S_1$ (e.g., a first temperature $T_1$) and a second feature in the image, detected at a second signal level $S_2$ (e.g., a second temperature $T_2$), wherein the gap between $S_1$ and $S_2$ spreads across an integer number of color space cycles, shall be presented by the same color (i.e., $T_1$ and $T_2$ shall be presented by the same color). Hence, as the color space cycle decreases, more features will appear using the same color, but since the gap between their respective temperatures is at least one complete color space cycle, these features shall be visually separated from each other, by other colors, thereby creating what would appear similar to altitude lines in a topographic map.

According to one aspect of the disclosed technique, the color space cycle is changed, in order to increase the visibility of details in a given image. Reference is now made to FIGS. 4A, 4B, 4C and 4D which are color representations of the image of FIG. 1B, wherein in each Figure, the color space is twice smaller than that of the preceding Figure. It is noted that the respective color space shift in FIGS. 1B, 4A, 4B, 4C and 4D is equal to zero.

Figure 4A:
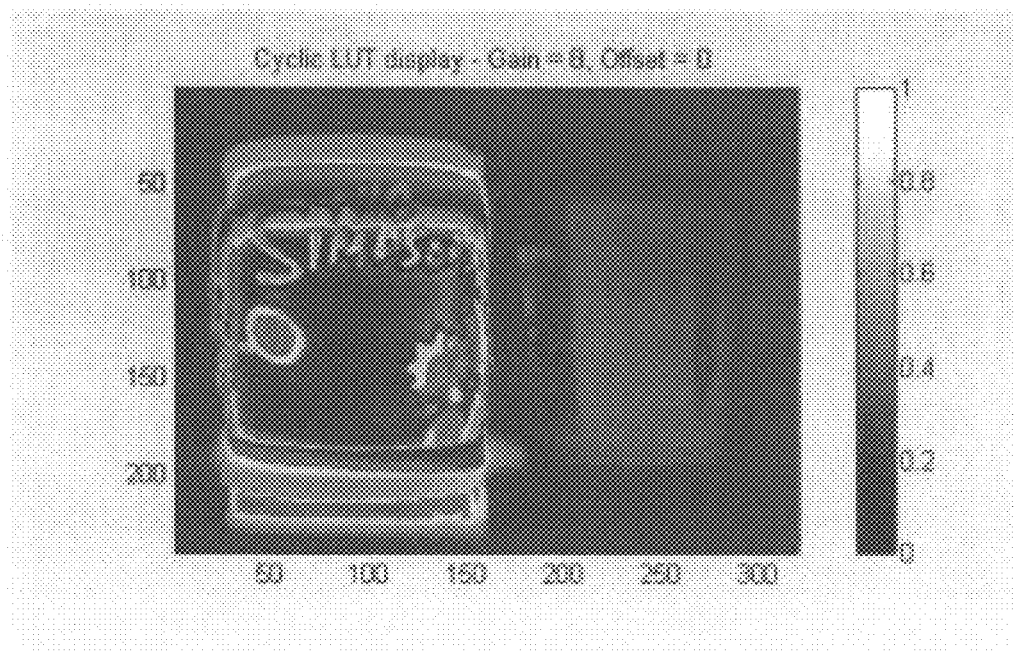
FIGS. 4A, 4B, 4C and 4D are color representations of the image of FIG. 1B, wherein in each Figure, the color space is twice smaller than that of the preceding Figure.

FIG. 4A is a color representation of the image of FIG. 1B, wherein the color space is repeated eight times across the dynamic range of the image. Contrary to the image of FIG. 1B, which spread the color space over the entire dynamic range of the image (also referred to as a single color cycle), the image of FIG. 4A applies the color space over an eighth portion of the dynamic range and then applies that same color space for each other eighth portion of the dynamic range, eight times all together. Accordingly, the image presented in FIG. 4A exhibits a color space cycle which is a division by eight of that exhibited by the image of FIG. 1B (i.e., the color space cycle of FIG. 4A is eight times as small as that of FIG. 1B). As can be seen from FIGS. 4A and 1B, FIG. 4A appears more detailed to the human eye, than FIG. 1B.

With reference to the image of FIG. 1B, the portion of interest in that image is the writing on the cup with cold water. As can be seen in FIG. 1B, that portion exhibits very little details, if any. With reference to FIG. 4A, this portion exhibits more details than FIG. 1B.

Figure 4B:
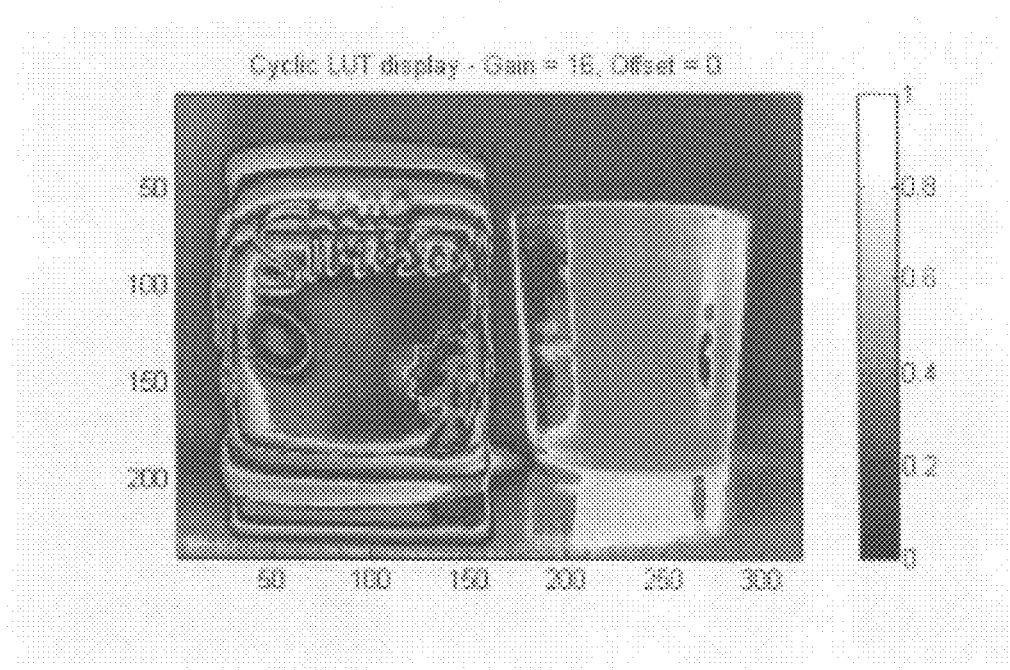

FIG. 4B is a color representation of the image of FIG. 1B, wherein the color space is repeated sixteen times across the dynamic range of the image. Accordingly, the image presented in FIG. 4B exhibits a color space cycle which is half of that of that exhibited by the image of FIG. 4A (i.e., the color space cycle of FIG. 4B is twice as small as that of FIG. 4A). As can be seen from FIGS. 4B and 4A, FIG. 4B appears more detailed to the human eye, than FIG. 4A. With reference to FIG. 4B, the portion of interest exhibits more details than as presented in FIG. 4A.

Figure 4C:
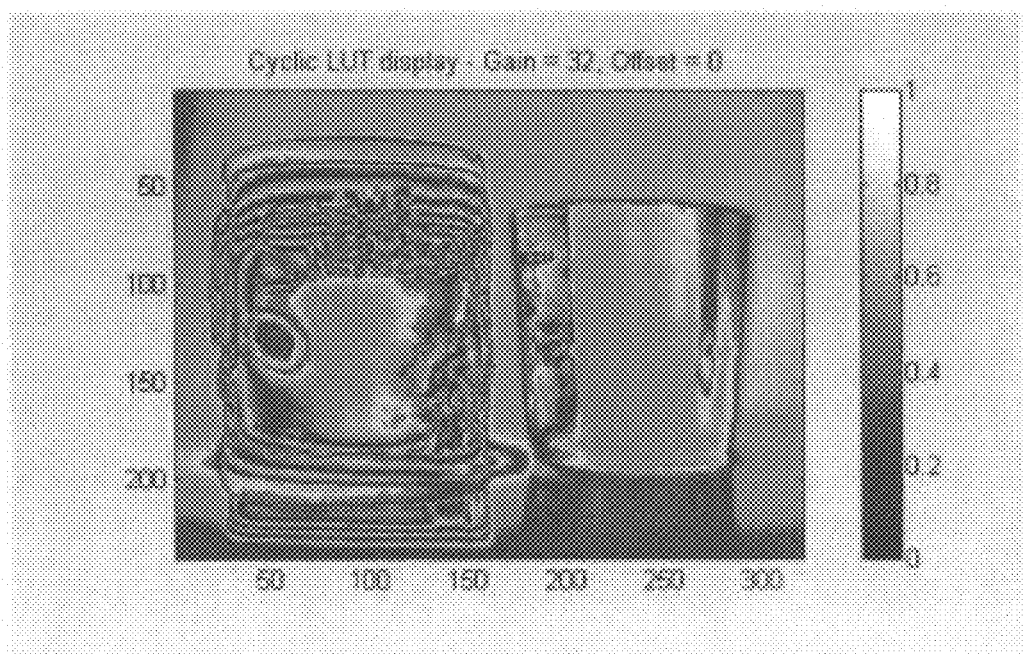

FIG. 4C is a color representation of the image of FIG. 1B, wherein the color space is repeated thirty-two times across the dynamic range of the image. Accordingly, the image presented in FIG. 4C exhibits a color space cycle which is half of that of that exhibited by the image of FIG. 4B and a quarter of that exhibited by the image of FIG. 4A (i.e., the color space cycle of FIG. 4C is twice as small as that of FIG. 4B and four times as small as that of FIG. 4A). As can be seen from FIGS. 4C and 4B, FIG. 4C appears more detailed to the human eye, than FIG. 4B. With reference to FIG. 4C, the portion of interest exhibits even more details than presented in FIG. 4B.

Figure 4D:
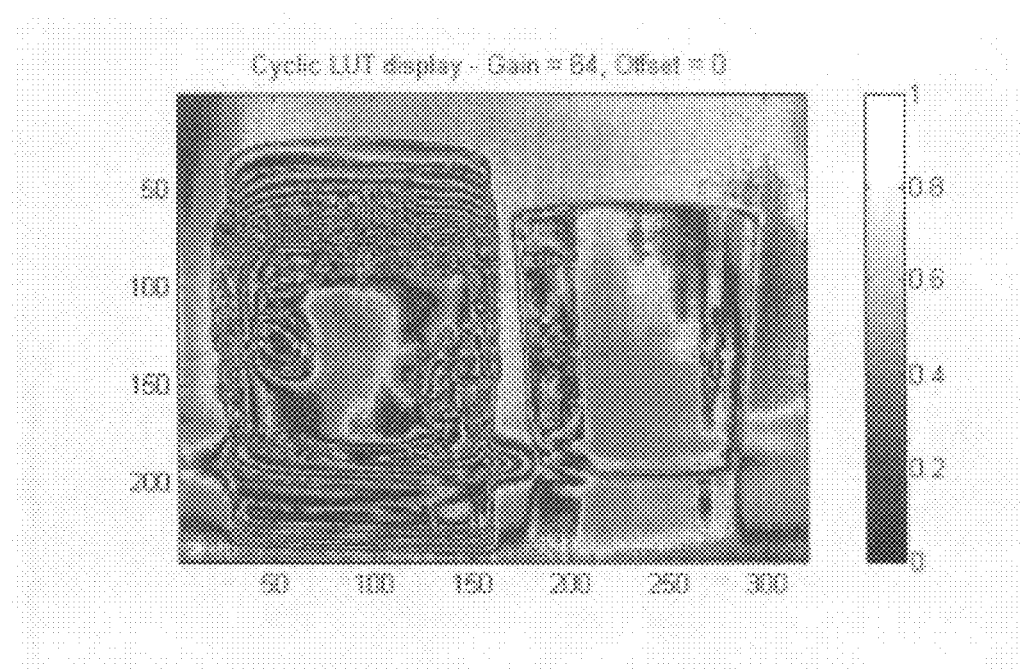

FIG. 4D is a color representation of the image of FIG. 1B, wherein the color space is repeated sixty-four times across the dynamic range of the image. Accordingly, the image presented in FIG. 4D exhibits a color space cycle which is half, four times smaller and eight times smaller of that of that exhibited by the images of FIGS. 4C, 4B and 4A, respectively. As can be seen from FIGS. 4D and 4C, FIG. 4D appears more detailed to the human eye, than FIG. 4C. With reference to FIG. 4DC, the portion of interest exhibits even more details than as presented in FIG. 4C. However, too many details may reduce the visibility of certain features, when the dynamic temperature range of these features exceeds the color space cycle.

As can be seen by reviewing the images of FIGS. 4A, 4B, 4C and 4D, with respect to the image of FIG. 1B, each time the color space cycle is reduced, more features and details are visible in the image. It is noted that the length of the color space cycle can be changed either automatically or by the user and that this change can either be discrete or continuous.

According to another aspect of the disclosed technique, the color space cycle can be different for different portions of the dynamic range. For example, the color space cycle can be smaller at the center of the dynamic range and larger at the ends of the dynamic range. Alternatively, the color space cycle may be adapted non-linearly to the dynamic range of the image (e.g., logarithmically)

According to another aspect of the disclosed technique, the color space cycle phase shift is changed, in order to increase the visibility of details in a given image. Reference is now made to FIGS. 5A, 5B, 5C, 5D, 5E, 5F and 5G, which are color representations of the image of FIG. 4C, wherein in each Figure, the color space is shifted by 0.125 of its length with respect to that of the preceding Figure. It is noted that the color space cycle in FIGS. 4C, 5A, 5B, 5C, 5D, 5E, 5F and 5G is identical (i.e., thirty-two times repeating color space cycle).

Figure 5A:
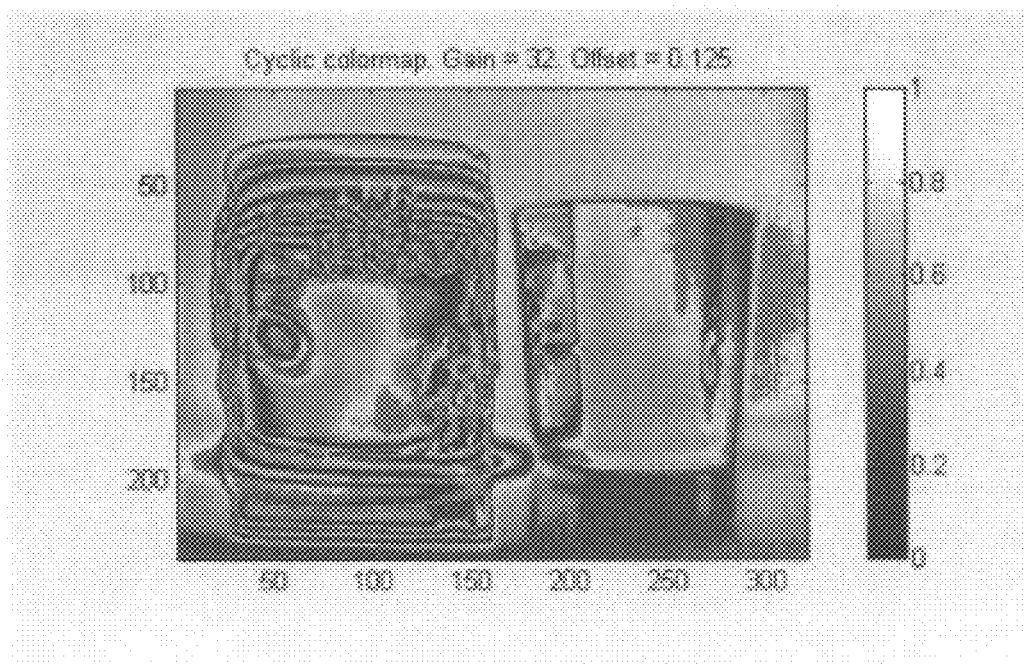
FIGS. 5A, 5B, 5C, 5D, 5E, 5F and 5G are color representations of the image of FIG. 4C, wherein in each Figure, the color space is shifted by 0.125 of its length with respect to that of the preceding Figure.
Figure 5B:
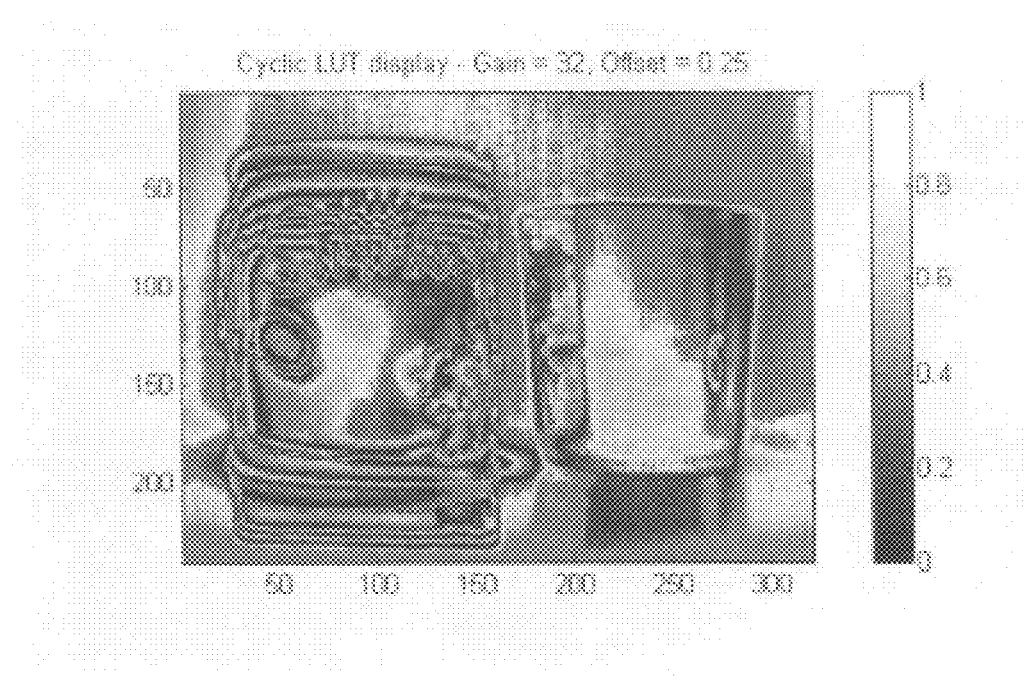
Figure 5C:
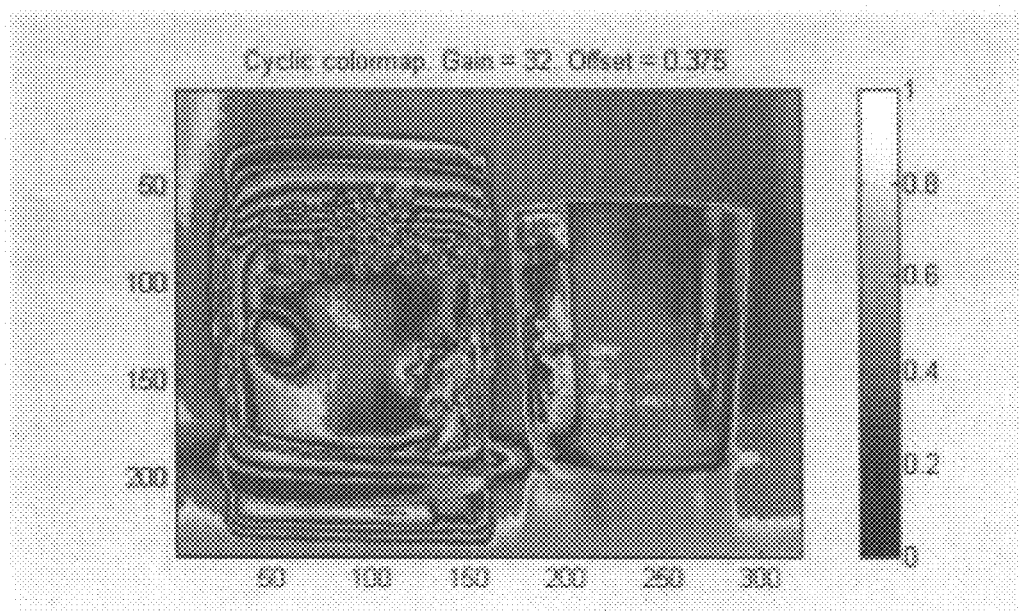
Figure 5D:
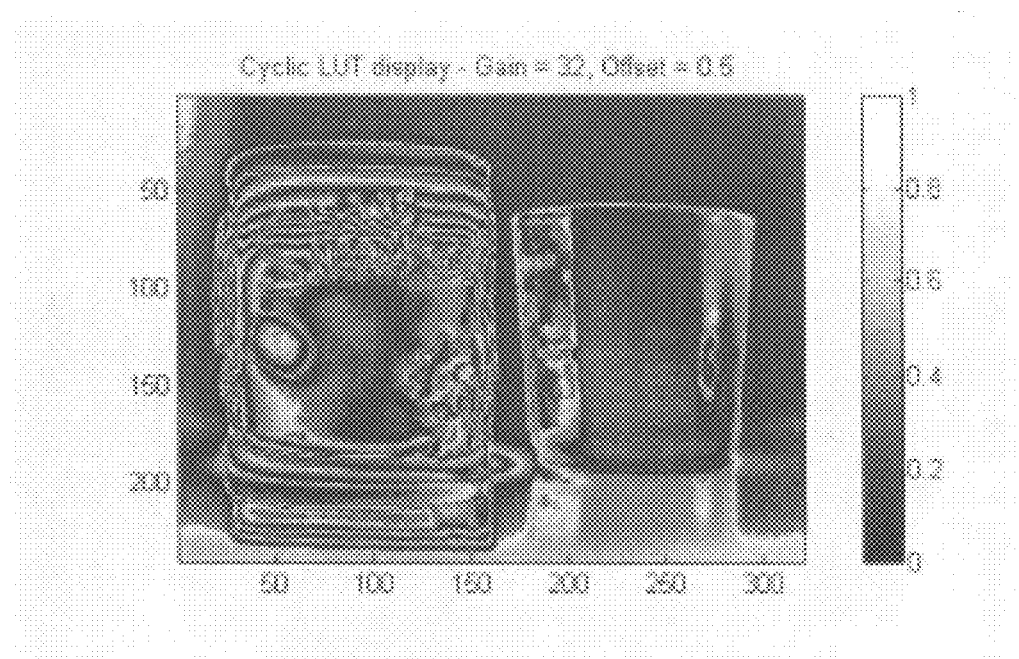
Figure 5E:
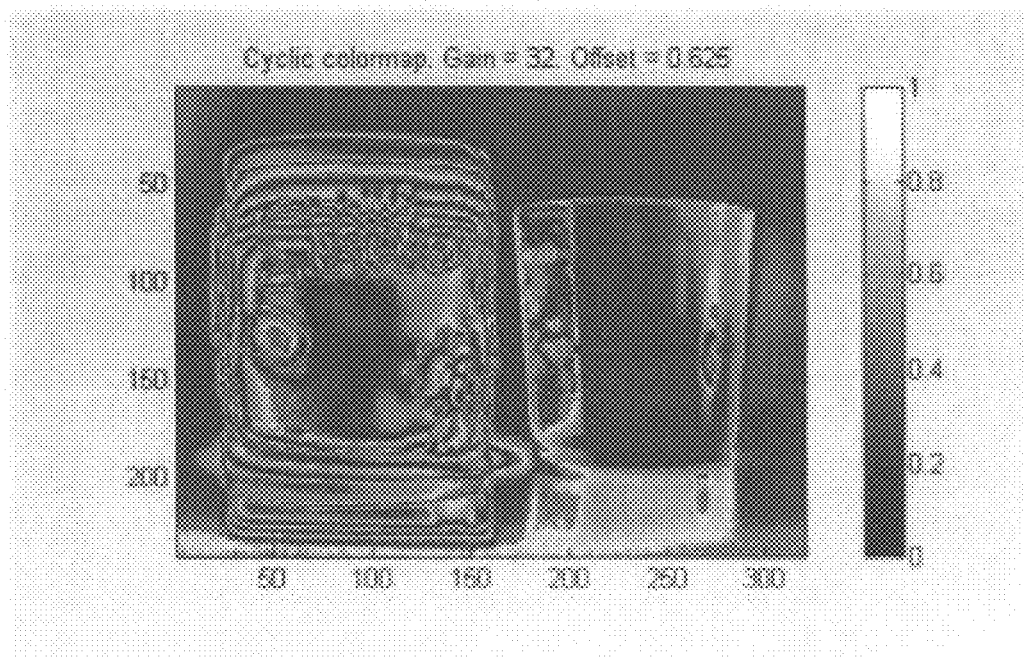
Figure 5F:
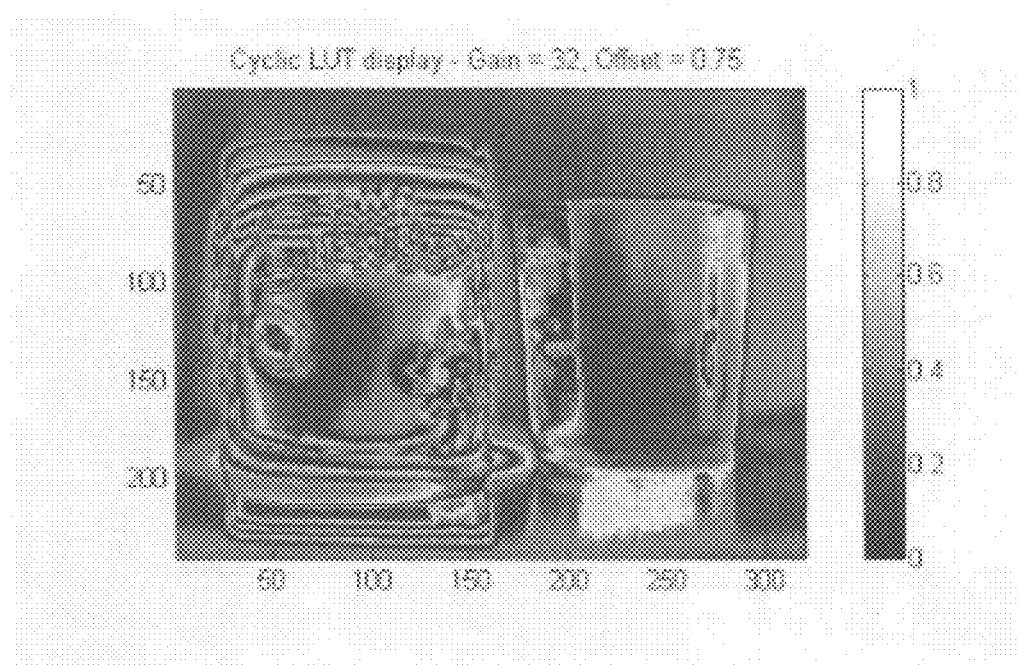
Figure 5G:
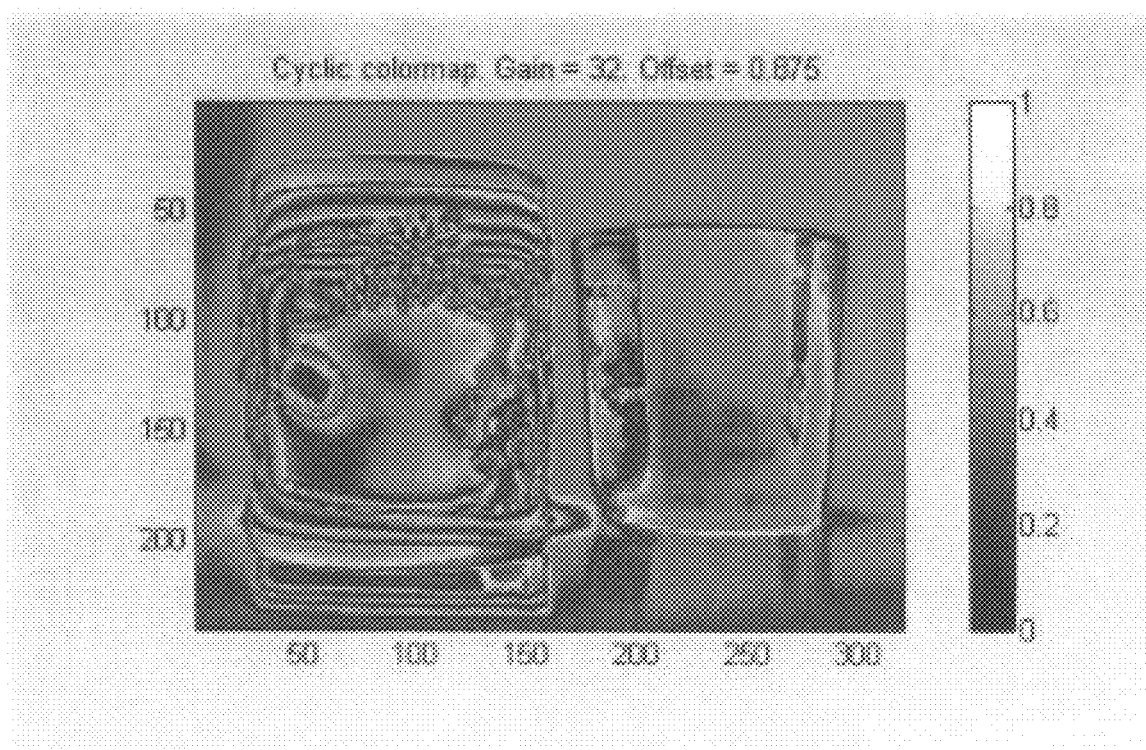

FIG. 5A is a color representation of the image of FIG. 4C (i.e., thirty-two times repeating color space cycle), wherein the color space is shifted by 0.125 of its length with respect to the position thereof in FIG. 4C. FIGS. 5B, 5C, 5D, 5E and 5F are color representation of the images of FIGS. 4C and 5A, each exhibiting a respective color space shift of 0.250, 0.375, 0.500, 0.625, 0.750 and 0.875 of its length, with respect to the position thereof in FIG. 4C.

As can be seen by reviewing the images of FIGS. 5A, 5B, 5C, 5D, 5E, 5F and 5G, with respect to the image of FIG. 4C, each time the color space cycle is shifted, different features and details are more visible in the image. It is noted that the shift of the color space cycle can be changed either automatically or by the user and that this change can either be discrete or continuous.

Figure 6:
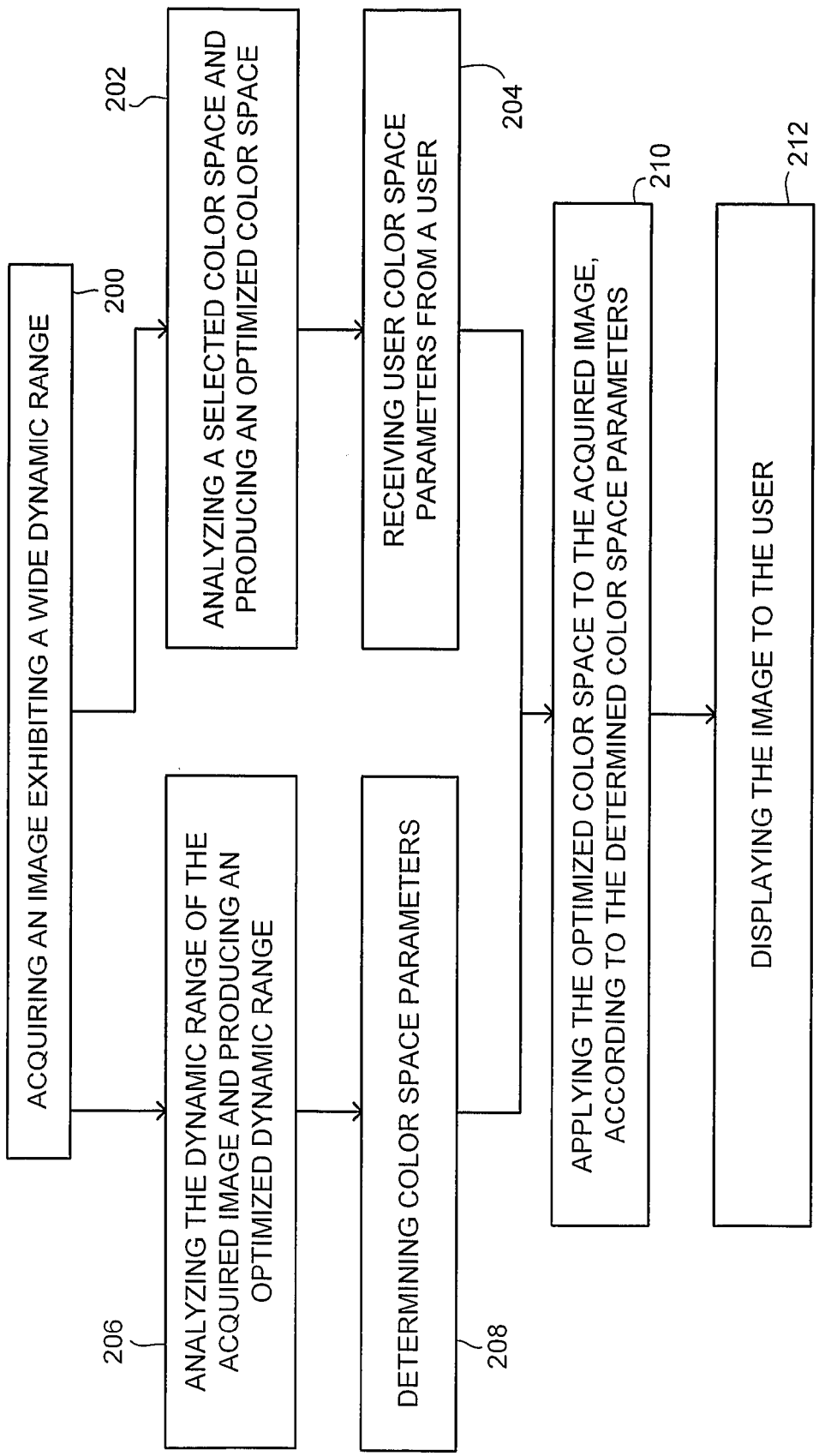
FIG. 6 is a schematic illustration of a method for operating the system of FIG. 3, operative in accordance with another embodiment of the disclosed technique.

Reference is now made to FIG. 6, which is a schematic illustration of a method for operating system 150 of FIG. 3, operative in accordance with another embodiment of the disclosed technique. In procedure 200, an image is acquired by an imager, which provides a wide dynamic range. With reference to FIG. 3, thermal imager 152 acquires an image, which when presented by conventional color conversion techniques provide a result as shown in FIG. 1B.

In procedure 202, a selected color space is analyzed and an optimized color space is produced. With reference to FIG. 3, color space analyzer 162 analyzes a selected color space to optimize it to the dynamic range of the acquired image, the effective dynamic range of the objects of interest in the acquired image, the color response of the human eye in general and of the specific user, in particular (e.g., partial color blindness), and the like.

In procedure 204, user color space parameters are received from a user, operating the system. These parameters may include a desired color space cycle length or size, a color space cycle shift, specific color space distribution, and the like. With reference to FIG. 3, the operator of system 150 enters user color space parameters via user interface 156.

In procedure 206, the dynamic range of the image, acquired in procedure 200, is analyzed and an optimized dynamic range is produced. Irrelevant portions of the dynamic range, such as the far ends thereof, may be disregarded and the remaining portions of the dynamic range expanded. In addition, the dynamic range may undergo resealing, either linear or non-linear. With reference to FIG. 3, dynamic range analyzer 162 analyzes the dynamic range of the image acquired by thermal imager 152 and produces an optimized dynamic range.

In procedure 208, color space parameters are determined. According to the outcome of procedures 202, 204 and 206, the color space parameters (e.g., color space cycle size, color space cycle shift, color space chromatic characteristics, color space distribution) to be applied to the acquired image, are determined. With reference to FIG. 3, color processor 158 determines the color space parameters.

In procedure 210, the optimized color space determined in procedure 202, is applied to the image acquired in procedure 200, according to the color space parameters determined in procedure 208. With reference to FIG. 3, dynamic range— color space converter 164 applies the optimized color space to the image acquired by thermal imager 152.

In procedure 212, the image produced in procedure 210, is displayed and presented to the user. With reference to FIG. 3, display 156 presents the image provided by dynamic range— color space converter 164, to the user.

Figure 7:
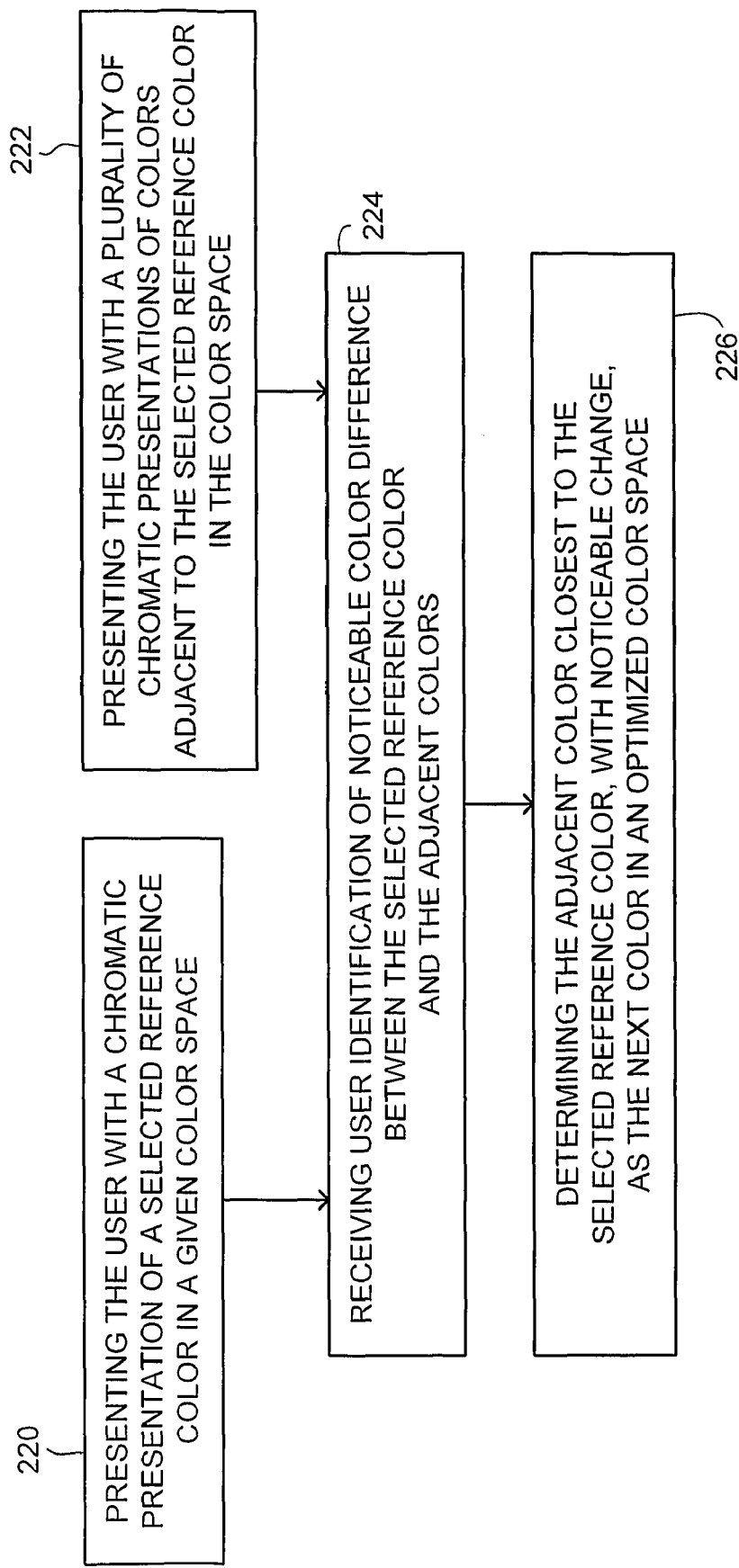
FIG. 7 is a schematic illustration of a method for producing an optimized color space.

Reference is now made to FIGS. 7 and 8. FIG. 7 is a schematic illustration of a method for producing an optimized color space. FIG. 8 is a chromatic illustration of colors presented to a user, in the process of executing the method of FIG. 7. FIG. 8 includes a table, generally referenced 230, containing a plurality of table cells, wherein each of these table cells presents a pair of colors. One of these colors is a selected reference color and the other color is located adjacent to the reference color in the color space, at a certain chromatic displacement there from. Each table cell exhibits a different chromatic displacement.

With reference to FIG. 7, in procedure 220, a chromatic presentation of a selected reference color in a given color space, is presented to the user. With reference to FIG. 8, the left side portion of each of the table cells visually presents a chromatic representation of the selected reference color.

In procedure 222, a plurality of chromatic presentations of colors adjacent to the selected reference color in the color space, are presented to the user. With reference to FIG. 8, the right side portion of each of the table cells visually presents a chromatic representation of a color adjacent to the selected reference color, each at a different chromatic displacement to the selected reference color in the color space. The upper left table cell exhibits the smallest chromatic displacements, wherein there is no noticeable visible difference between the two colors in the cell. The lower right table cell exhibits the largest chromatic displacements, and a highly noticeable visible difference between the two colors in that table cell.

In procedure 224, a user indication of noticeable color difference between the selected reference color and the chromatic adjacent colors, is received. With reference to FIG. 8, the user marks table cell 232 as the first cell with noticeable chromatic difference between the two colors therein.

In procedure 226, the adjacent color closest to the selected reference color, with noticeable change to the user, is determined the next color in an optimized color space. With reference to FIG. 8, the right side color in table cell 232 is determined the next color in an optimized color space and if further selected the as the reference color, for a repetition of the method, from procedure 220, until the optimized color space is complete.

It is noted that the obtained color space may be further smoothed, interpolated or otherwise processed in order to further optimize it. It is further noted that outcome of the method of FIG. 7, can be provided in the form of an optimized color space or as a look-up table, which points to a conventional color space and rearranges it as an optimized one.

Figure 9A:
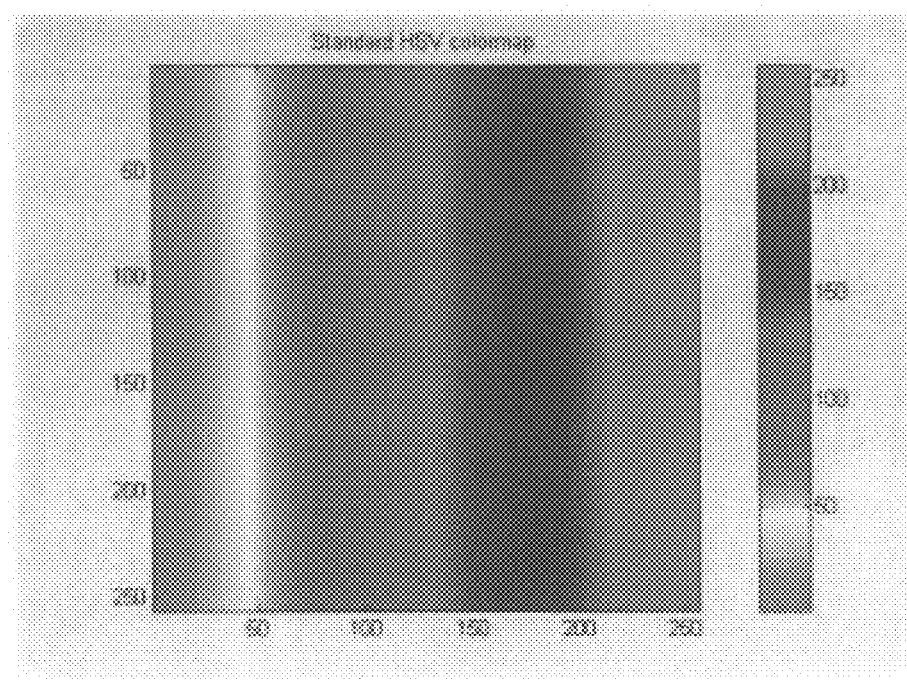
FIG. 9A is a schematic illustration of a standard HSV color space.
Figure 9B:
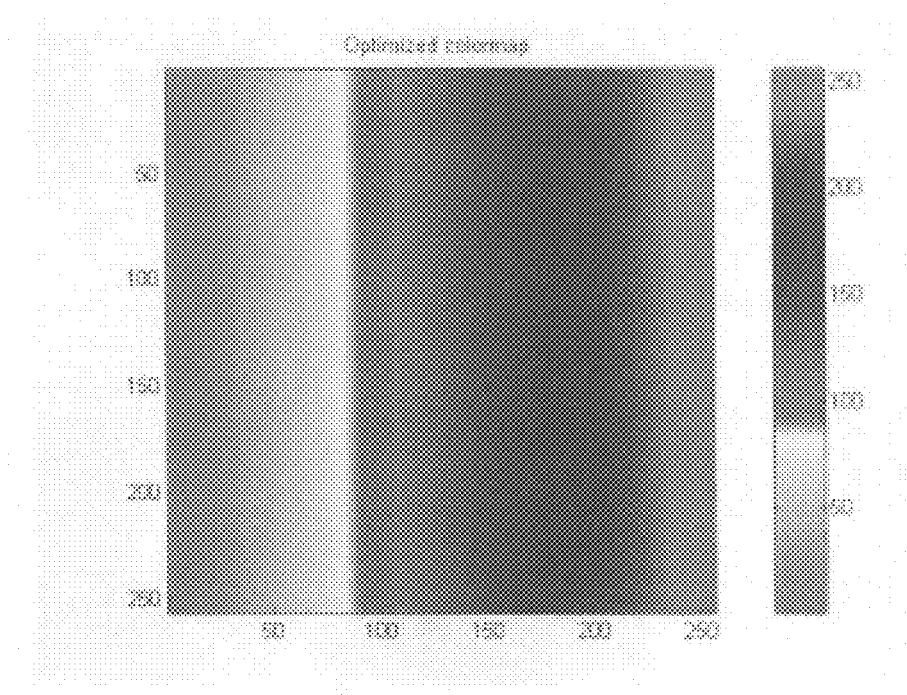
FIG. 9B is a schematic illustration of an optimized HSV color space, produced according to the method of FIG. 8.

Reference is now made to FIGS. 9A and 9B. FIG. 9A is a schematic illustration of a standard HSV color space. FIG. 9B is a schematic illustration of an optimized HSV color space, produced according to the method of FIG. 8.

Figure 10:
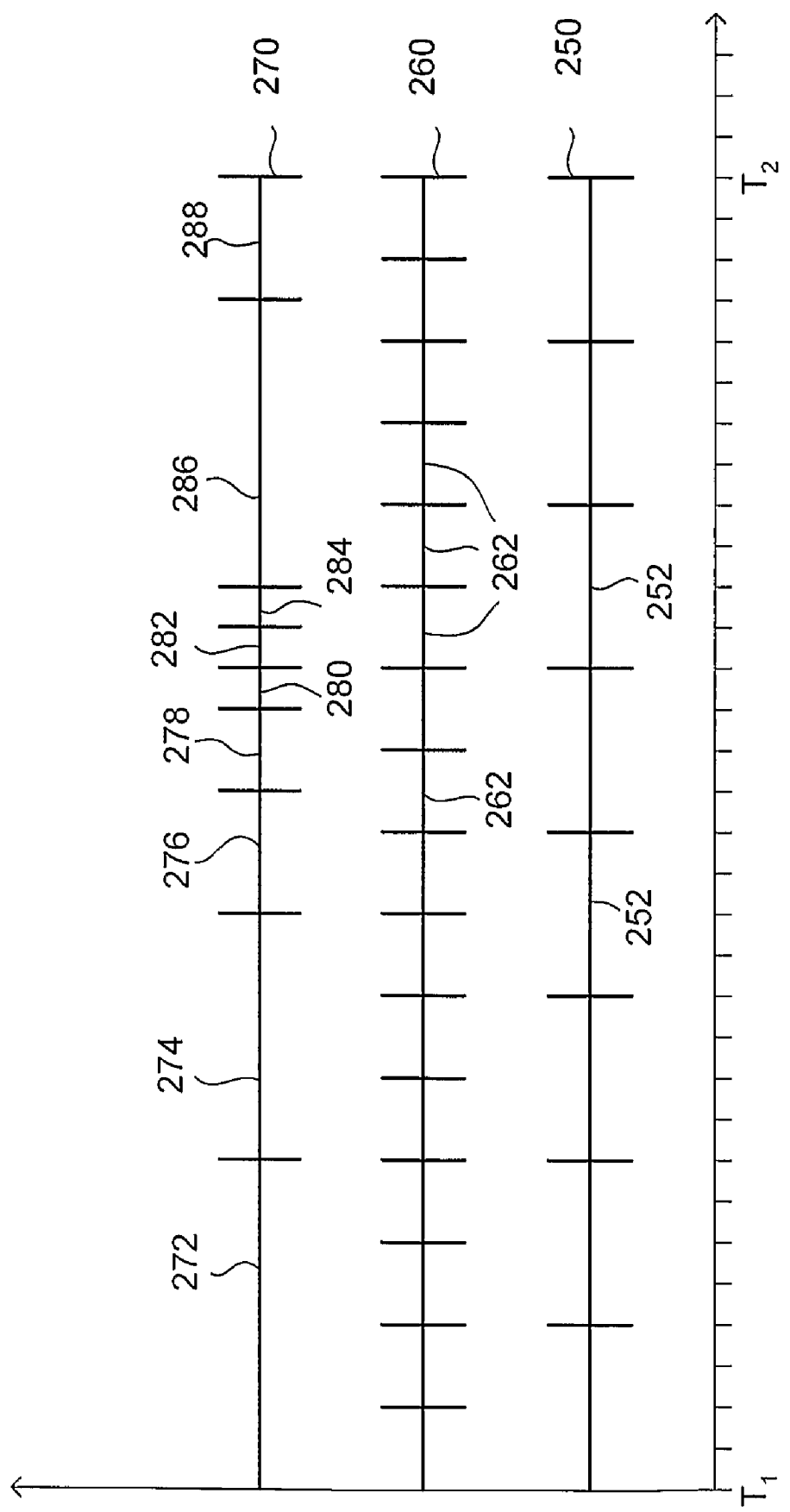
FIG. 10 is a schematic illustration of different color space distribution configurations, across a dynamic range which spreads between a first temperature $T_1$ and a second temperature $T_2$.

According to a further embodiment of the disclosed technique, the distribution of a color space across the dynamic range of the image, can be modified in various formats. Reference is now made to FIG. 10, which is a schematic illustration of different color space distribution configurations, across a dynamic range which spreads between a first signal $S_1$ and a second signal $S_2$. The dynamic range between $S_1$ and $S_2$ is divided into thirty-two even segments.

Color space distribution configuration 250 divides the dynamic range between $S_1$ and $S_2$ into eight even portions, generally referenced 252, each extending across four segments, each assigned for a complete color space cycle. Color space distribution configuration 260 divides the dynamic range between $S_1$ and $S_2$ into sixteen even portions, generally referenced 262, each extending across two segments, each assigned for a complete color space cycle.

Color space distribution configuration 270 divides the dynamic range between $S_1$ and $S_2$ into nine uneven portions 272, 274, 276, 278, 280, 282, 284, 286 and 288, each assigned for a complete color space cycle. Portion 272 is eight segments long, portion 286 is seven segments long, portion 274 is six segments long, portions 276 and 288 are each three segments long, portion 278 is two segments long and portions 280, 282 and 284 are one segment long. A color space distribution such as that of color space distribution configuration 270, enables the user to increase chromatic resolution only in a portions of interest within the dynamic range, while reducing chromatic resolution in the rest of the dynamic range. Accordingly, in a thermal imaging application, such a color space distribution would emphasize objects which exhibit temperatures within these portions of interest.

According to another embodiment of the disclosed technique, the user can select a portion of interest in the image (e.g., a certain person in a crowd). The selected portion is then analyzed to determine the local dynamic range thereof, and a color scheme configuration is applied to the selected portion only, leaving the rest of the image at low chromatic resolution or at no chromatic resolution (i.e., gray scale).

It will be appreciated by persons skilled in the art that the disclosed technique is not limited to what has been particularly shown and described hereinabove. Rather the scope of the disclosed technique is defined only by the claims, which follow.

The invention claimed is:

1. System for presenting an image, exhibiting a dynamic range, the system comprising:
   a dynamic range analyzer, for analyzing the dynamic range of said image;
   a color space analyzer, for determining a color space configuration more than one cycle of a color space; and
   a dynamic range—color space converter, coupled with said dynamic range analyzer and with said color space analyzer, for applying said color space configuration to said dynamic range, thereby enabling visual perception of features which were essentially un-noticeable in said image prior to applying said color space configuration to said dynamic range.

2. The system according to claim 1, further comprising a color processor encapsulating said dynamic range analyzer, said color space analyzer and said dynamic range—color space converter.

3. The system according to claim 2, further comprising a display for presenting said image to a user, according to said color space configuration.

4. The system according to claim 2, further comprising a user interface for receiving color space configuration modifications instructions from a user.

5. The system according to claim 2, further comprising an image detector for acquiring said image.

6. The system according to claim 5, wherein said image detector is selected from the list consisting of:
   near infrared image detector;
   short wave infrared image detector;
   ultra violet image detector;
   computerized tomography image detector;
   nuclear imaging image detector;
   ultrasound image detector;
   X-ray image detector;
   ultra wide band (UWB) image detector;
   synthetic aperture radar (SAR) image detector; and
   scanning electron microscope (SEM).

* * * * *